US006107268A

United States Patent [19]

Yahiaoui et al.

[11] Patent Number: 6,107,268

[45] Date of Patent: Aug. 22, 2000

[54] SORBENT MATERIAL

[75] Inventors: Ali Yahiaoui, Roswell; Craig Farrell Thomaschefsky, Marietta; Taiwoo Chiu, Alpharetta, all of Ga.

[73] Assignee: Kimberly-Clark Worldwide, Inc., Neenah, Wis.

[21] Appl. No.: 09/293,294

[22] Filed: Apr. 16, 1999

[51] Int. Cl.[7] .......... C11D 17/00; C11D 1/00; C11D 10/00; B32B 5/02; B32B 27/04

[52] U.S. Cl. .......... 510/438; 510/175; 510/536; 442/60; 442/112; 442/116; 442/119

[58] Field of Search .......... 510/438, 175, 510/536; 428/219, 903, 195; 442/60, 112, 116, 119

[56] References Cited

U.S. PATENT DOCUMENTS

| | | | |
|---|---|---|---|
| 2,969,332 | 1/1961 | Lawler et al. | 252/354 |
| 3,167,514 | 1/1965 | Baker | 252/170 |
| 3,959,421 | 5/1976 | Weber et al. | 265/6 |
| 4,041,203 | 8/1977 | Brock et al. | 428/157 |
| 4,096,311 | 6/1978 | Pietreniak | 428/289 |
| 4,302,366 | 11/1981 | Perronin et al. | 252/8.57 |
| 4,307,143 | 12/1981 | Meitner | 252/91 |
| 4,328,279 | 5/1982 | Meitner et al. | 428/289 |
| 4,434,087 | 2/1984 | Hampson et al. | 252/545 |
| 4,464,293 | 8/1984 | Dobrin | 250/547 |
| 4,468,428 | 8/1984 | Early et al. | 428/221 |
| 4,478,853 | 10/1984 | Chaussee | 424/358 |
| 4,609,580 | 9/1986 | Rockett et al. | 428/198 |
| 4,622,258 | 11/1986 | Mencke | 428/171 |
| 4,627,931 | 12/1986 | Malik | 252/153 |
| 4,627,936 | 12/1986 | Gould et al. | 252/558 |
| 4,650,479 | 3/1987 | Insley | 604/358 |
| 4,678,698 | 7/1987 | Mencke | 428/171 |
| 4,839,098 | 6/1989 | Wisotzki et al. | 252/557 |
| 4,904,521 | 2/1990 | Johnson et al. | 428/284 |
| 4,904,524 | 2/1990 | Yoh | 428/311.3 |
| 4,938,888 | 7/1990 | Kiefer et al. | 252/91 |
| 4,940,626 | 7/1990 | Rhodes, III et al. | 428/198 |
| 4,956,170 | 9/1990 | Lee | 424/81 |
| 5,015,414 | 5/1991 | Kamegai et al. | 252/545 |
| 5,041,275 | 8/1991 | Miller | 423/269 |
| 5,057,361 | 10/1991 | Sayovitz et al. | 428/290 |
| 5,094,770 | 3/1992 | Sheridan et al. | 252/91 |
| 5,167,950 | 12/1992 | Lins | 424/47 |
| 5,173,356 | 12/1992 | Eaton et al. | 428/219 |
| 5,223,319 | 6/1993 | Cotton et al. | 428/131 |
| 5,279,667 | 1/1994 | Das | 134/3 |
| 5,281,463 | 1/1994 | Cotton | 428/126 |
| 5,288,486 | 2/1994 | White | 424/78.08 |
| 5,302,249 | 4/1994 | Malhotra et al. | 162/135 |
| 5,362,832 | 11/1994 | Cook | 526/333 |
| 5,370,816 | 12/1994 | Balzer et al. | 252/132 |
| 5,376,366 | 12/1994 | Petchul et al. | 424/78.07 |
| 5,385,750 | 1/1995 | Aleksejczyk et al. | 427/4 |
| 5,405,602 | 4/1995 | Simmons et al. | 424/47 |
| 5,418,045 | 5/1995 | Pike et al. | 428/198 |
| 5,453,540 | 9/1995 | Dams et al. | 564/96 |
| 5,508,029 | 4/1996 | Petchul et al. | 424/78.07 |
| 5,540,979 | 7/1996 | Yahiaoui et al. | 428/212 |
| 5,545,481 | 8/1996 | Harrington | 428/378 |
| 5,582,907 | 12/1996 | Pall | 428/287 |
| 5,591,442 | 1/1997 | Diehl et al. | 424/401 |
| 5,609,587 | 3/1997 | Roe | 604/360 |
| 5,620,788 | 4/1997 | Garavaglia et al. | 442/118 |
| 5,624,676 | 4/1997 | Mackey et al. | 424/414 |
| 5,629,006 | 5/1997 | Hoang et al. | 424/405 |
| 5,639,541 | 6/1997 | Adam | 428/198 |
| 5,652,048 | 7/1997 | Haynes et al. | 442/351 |
| 5,656,361 | 8/1997 | Vogt et al. | 428/198 |
| 5,681,963 | 10/1997 | Liss | 548/455 |
| 5,770,549 | 6/1998 | Gross | 510/238 |
| 5,783,692 | 7/1998 | Kirby et al. | 536/123.1 |
| 5,895,504 | 4/1999 | Sramek et al. | 8/137 |
| 5,901,706 | 5/1999 | Griesbach et al. | 128/849 |
| 5,968,204 | 10/1999 | Wise | 8/142 |

FOREIGN PATENT DOCUMENTS

| | | |
|---|---|---|
| 0 604 996 | 12/1993 | European Pat. Off. . |
| 2353265 | 12/1977 | France . |
| 97/00738 | 1/1997 | WIPO . |
| 97/34971 | 9/1997 | WIPO . |
| 98/10134 | 3/1998 | WIPO . |
| 99/05357 | 2/1999 | WIPO . |

OTHER PUBLICATIONS

Abstract of JP 01–192860.

Polymeric Transport Systems, “Microsponge 5645 Mineral Oil”.

Polymeric Transport Systems, “Microsponge 5647 Glycerin”.

Polymeric Transport Systems, “Polytrap 6035 Cyclomethicone”.

Polymeric Transport Systems, “Polytrap 7100 Macro-Beads”.

New Raw Materials, “Polymeric Controlled Release”.

Happi Magazine, “Acrylates Copolyner: A Technique for Entrapping Cosmetic Actives,” Jul. 1989.

CYTEC Industries, Inc., “Aerosol” 1990.

*Primary Examiner*—Yogendra Gupta
*Assistant Examiner*—John M. Petruncio
*Attorney, Agent, or Firm*—Douglas H. Tulley

[57] ABSTRACT

A sorbent material is provided comprising a porous substrate, such as a nonwoven web, having a wetting chemistry distributed substantially throughout the substrate. The wetting chemistry can comprise (a) an aliphatic alcohol ethoxylate; (b) one or more of an alkyl sulfosuccinate, an alkyl sulfate and a sulfated fatty acid ester and, optionally, (c) a fatty acid ester ethoxylate. Various formulations are provided having low metal ion concentrations, anti-static properties and/or good absorption characteristics for a broad spectrum of liquids.

13 Claims, 1 Drawing Sheet

SORBENT MATERIAL

FIELD OF THE INVENTION

The present invention relates to sorbent materials. More particularly the present invention relates to sorbent wipers suitable for various industrial uses.

BACKGROUND OF THE INVENTION

Improvements in the manufacturing of high technology items such as micro-electronic devices or integrated circuits have necessitated the maintenance of essentially a "clean room" atmosphere. Integrated circuits typically include a desired pattern of components which generally include a series of electrically active regions and electrical insulation regions located within a semi-conductor wafer. The electrically active regions within the semiconductor body or wafer are then interconnected with a detailed metallic electrical interconnection pattern in order to obtain the desired operating characteristics. The formation of the electrically active or insulation regions and the corresponding electrical interconnects involve a significant number of different processes well known in the art, examples being chemical vapor deposition of conductors and insulators, oxidation processes, solid state diffusion, ion implantation, vacuum depositions, various lithographic techniques, numerous forms of etching, chemical-mechanical polishing and so forth. A typical integrated circuit fabrication process utilizes a great number of cycles, each of which may utilize a specific sequence of one or more of the above processes.

Many of the components of an integrated circuit made by the aforesaid processes are of such a minute size and/or thickness that the presence of even minor levels of contaminants can be fatal to fabrication of the integrated circuit. For example, by normal standards small bits of lint or dust are not problematic but due to the relative size of the components of an integrated circuit such contaminants can bridge interconnects or insulation regions and cause defects within the device. Therefore, there is a need to maintain all surfaces and workpieces free from such contamination. This is usually accomplished in part by wiping these surfaces, and a number of specialized wipers have been developed for this purpose. However, it is critical that the wiper efficiently cleans surfaces and does not itself release dust, lint or other particulate matter. Various nonwoven wipes are available, but while some are low linting, these require treatment for wettability in order to provide the absorbency and clean wiping characteristics desired for clean room applications. Such treatments typically utilize anionic wetting agents that are high in sodium ion content. These metallic ions present special problems since, if present in high concentrations, they may change the electrical properties of sensitive electrical components and/or cause defects therein.

In addition, sorbent materials having the ability to dissipate charges are less likely to develop or release a static charge. In this regard, sorbent materials used in proximity to electrically sensitive devices, such as integrated circuits and/or micro-electronic devices, desirably have good anti-static properties. Although the current generated from static electricity is small by many standards, it is relatively large with respect to the electrical load intended to be carried by interconnection patterns within integrated circuits and other micro-electronic devices. Thus, static electricity can be fatally destructive to such devices. In addition, when collecting or containing flammable liquids it is likewise highly desirable that the wipers have excellent anti-static properties in order to avoid igniting the same. However, although anti-static properties are often desirable, use of conventional ionic compounds that impart anti-static properties can negatively impact the emulsion stability or absorbency characteristics of the sorbent materials.

In addition, sorbent materials desirably exhibit the ability to quickly absorb or wick liquid into the article. Sorbent materials, particularly wipes, which do not quickly absorb liquids, make it more difficult to remove or collect liquids from a hard surface. Further, sorbent materials desirably exhibit the ability to retain such liquids once wicked into the fabric. When sorbent materials cannot retain absorbed liquid they tend to leak or drip fluid once removed form the supporting surface. This can be disadvantageous in making clean up more difficult and/or by further spreading undesirable liquids. Thus, sorbent materials that can quickly absorb significant capacities of liquids and which also have the ability to retain the same are highly desirable. Further, sorbent materials capable of absorbing a wide variety of liquids are likewise highly desirable.

Accordingly, there exists a need for sorbent materials which are suitable for use with clean room applications and which have low metallic ion concentrations. Further, there exists a need for such sorbent materials that have excellent anti-static properties. Still further, there exists a need for sorbent materials a web that have excellent antistatic properties and that also exhibit excellent absorbency characteristics.

SUMMARY OF THE INVENTION

The aforesaid needs are fulfilled and the problems experienced by those skilled in the art overcome by the sorbent materials of the present invention. In one aspect of the invention, the sorbent material can comprise a porous substrate having a wetting chemistry upon the surfaces thereof comprising: (a) an aliphatic alcohol ethoxylate; and (b) a surfactant selected from the group consisting of an alkyl sulfosuccinate, an alkyl sulfate and/or a sulfated fatty acid ester. Desirably, the parts by weight ratio of the components, a:b, ranges from about 9:1 to about 1:1, respectively.

In a further aspect, the present invention also provides a sorbent material having excellent anti-static properties comprising a porous substrate having a wetting chemistry upon the surfaces thereof comprising: (a) an alcohol ethoxylate selected from the group consisting of an alkyl alcohol ethoxylate, an aryl alcohol ethoxylate and halogenated analogs thereof; (b) a surfactant selected from the group consisting of an alkyl sulfosuccinate, an alkyl sulfate and a sulfated fatty acid ester; and (c) a fatty acid ester ethoxylate such as, for example, a poly(ethylene glycol)ester. Desirably the components of the wetting chemistry, a:b:c, are in a weight ratio of approximately 1:1:1 to about 4:1:1, respectively. The wetting chemistry can be applied to a porous substrate such as a nonwoven web. As a particular example, the wetting chemistry can be applied to a nonwoven web of polyolefin meltblown fibers such that the wetting chemistry comprises from about 0.1% to about 5% of the treated web.

DEFINITIONS

Figure 1:
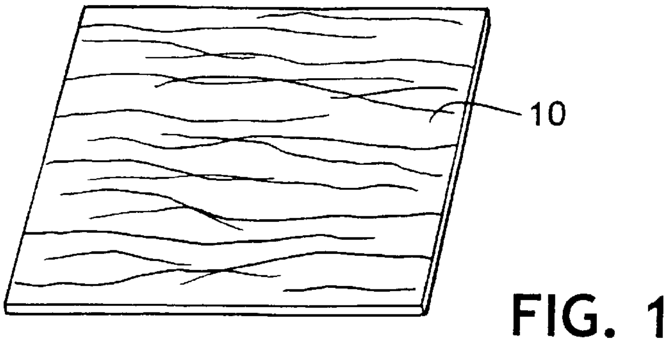
FIG. 1 is a perspective partially elevated view of a porous substrate suitable for use with the present invention.

As used herein, the term "comprising" is inclusive or open-ended and does not exclude additional unrecited elements, compositional components, or method steps.

As used herein the term "nonwoven" fabric or web means a web having a structure of individual fibers or threads which are interlaid, but not in an identifiable manner as in a knitted or woven fabric. Nonwoven fabrics or webs have been formed by many processes such as, for example, meltblowing processes, spunbonding processes, hydroentangling, air-laid processes, bonded carded web processes and so forth.

As used herein, the term "sheet" refers to a layer of material that can be a foam, woven material, knitted material, scrim, nonwoven web or other like material.

As used herein, the term "machine direction" or MD means the length of a fabric in the direction in which it is produced. The term "cross machine direction" or CD means the width of fabric, i.e. a direction generally perpendicular to the MD.

As used herein, the term "liquid" refers to liquids generally regardless of form and includes solutions, emulsions, suspensions and so forth.

As used herein, the term "porous material" includes those materials having open areas or interstitial spaces located between a material's surface, the open areas or interstitial spaces need not extend through the entirety of the material and can collectively form pathways through the thickness of the material via adjacent, inter-connecting spaces or openings.

DESCRIPTION OF THE INVENTION

The sorbent material of the present invention can comprise a porous substrate having applied thereto a wetting chemistry comprising a mixture of (a) about 50% to about 90% (by weight) of an aliphatic alcohol ethoxylate and (b) 10% to about 50% (by weight) of a surfactant selected from the group consisting of an alkyl sulfosuccinate, an alkyl sulfate and a sulfated fatty acid ester. Desirably, the aforesaid components of the wetting chemistry are in a ratio of about 4:1 to 9:1 (parts by weight). The wetting chemistry desirably comprises from about 0.1% to about 5% of the treated substrate. The sorbent materials can exhibit an Electrostatic Decay (90%) of less than 0.5 seconds. Further, sorbent materials of the present invention can provide the aforesaid characteristics while having low metallic ion extractables; in this regard the sorbent material desirably has metal ion extractables less than 100 parts per million (ppm) and still more desirably has metal ion extractables less than about 70 parts per million (ppm). Still further, the sorbent materials have good absorption characteristics.

Desirably the first component comprises a non-ionic surfactant such as a linear alkyl alcohol ethoxylate. The linear alkyl alcohol ethoxylate desirably comprises an aliphatic ethoxylate having from about two to twenty-five carbons in the alkyl chain and more desirably has from about five to about eighteen carbons in the alkyl chain. In addition, the alkyl alcohol ethoxylate desirably has from about four to about twelve ethylene oxide units. An exemplary commercially available linear alkyl ethoxylate available from ICI Surfactants under the trade name RENEX KB (also known as SYNTHRAPOL KB) which comprises polyoxyethylene decyl alcohol having an average of about 5.5 ethylene oxide (EtO) units.

A second component of the wetting chemistry can include a surfactant selected from the group consisting of an alkyl sulfosuccinate, an alkyl sulfate and a sulfated fatty acid ester. Preferred surfactants include alkyl sulfosuccinates such as, for example, sodium dioctyl sulfosuccinate. Other suitable alkyl sulfosuccinates include sodium dihexyl sulfosuccinate, sodium dicyclohexyl sulfosuccinate, disodium isodecyl sulfosuccinate and the like. A suitable commercially available sodium dioctyl sulfosuccinate is available from Cytec Industries, Inc. under the trade name AEROSOL OT-75. Commercially available alkyl sulfates are available from Henkel Corporation under the trade name SULFOTEX OA which comprises sodium 2-ethylhexyl sulfate and from ICI Surfactants under the trade designation G271 which comprises N-ethyl-N-soya morpholinium ethosulfate. In addition, alkylated sulfates such as sodium lauryl sulfates are also suitable for use in the present invention. Further, commercially available sulfated fatty acid esters are available from ICI Surfactants under the trade name CALSOLENE OIL HA which comprises a sulfated oleic acid ester.

In a further aspect of the invention a novel sorbent material is provided having excellent absorbent characteristics and improved anti-static properties. Thus, in further aspect of the present invention the a wetting chemistry can comprise a mixture of (a) about 10% to about 90% (by weight) of an alcohol ethoxylate selected from the group consisting of an alkyl alcohol ethoxylate, an aryl alcohol ethoxylate and/or fluorinated analogs thereof; and (b) about 5% to about 85% (by weight) of a surfactant selected from the group consisting of an alkyl sulfosuccinate, an alkyl sulfate and a sulfated fatty acid ester; and (c) about 5% to about 50% (by weight) of a fatty acid ester ethoxylate. In this regard it has surprisingly been found that inclusion of one or more fatty acid ester ethoxylates can significantly improve the anti-static properties of the wetting chemistry. It is believed that the fatty acid ester ethoxylate interacts synergistically with component (a) and/or (b) thereby enhancing the anti-static properties of the wetting chemistry and/or porous materials treated therewith. Desirably the wetting chemistry comprises a mixture of (a) about 50% to about 90% (by weight) of an alkyl or aryl alcohol ethoxylate; and (b) about 10% to about 35% (by weight) of a surfactant selected from the group consisting of an alkyl sulfosuccinate, an alkyl sulfate and a sulfated fatty acid ester alkyl sulfosuccinate; and (c) about 5% to about 35% (by weight) of a fatty acid ester ethoxylate. In a preferred embodiment of the invention, components (a):(b):(c) are mixed in a weight ratio of approximately 1:1:1 to approximately 4:1:1, respectively.

With regard to the first component of the wetting chemistry, preferred alcohol ethoxylates desirably include those having the following formula:

$$R_1—O—(EtO)_n—R_2$$

where:

$R_1$=alkyl $C_4$–$C_{22}$ and even more desirably $C_8$–$C_{20}$ or $C_7$–$C_{22}$ alkyl phenyl and more desirably $C_9$–$C_{16}$;

$R_2$=alkyl $C_1$–$C_{10}$ and even more desirably $C_1$–$C_6$;

EtO=ethylene oxide n=2–25 and even more desirably 3–15

As an example, a suitable commercially available aryl alcohol ethoxylate is available from Union Carbide under the trade name TRITON such as, for example, TRITON X-102 which comprises an octyl phenol ethoxylate having approximately 11 ethylene oxide (EtO) units. Additionally, a particularly preferred alcohol ethoxylate comprises an aliphatic alcohol ethoxylate having from about five to about eighteen carbons in the alkyl chain. An exemplary commercially available aliphatic alcohol ethoxylate is available from ICI Surfactants under the trade name RENEX KB (also known as SYNTHRAPOL KB) which comprises polyoxyethylene decyl alcohol having an average of about 5.5 ethylene oxide (EtO) units.

The second component, i.e. component (b), of the anti-static wetting chemistry can include a surfactant selected from the group consisting of an alkyl sulfosuccinate, an alkyl sulfate and a sulfated fatty acid ester such as those described herein above.

With regard to the third component, the fatty acid ester ethoxylate also helps improve the breadth of the absorbent spectrum. Moreover, utilization of a fatty acid ester ethoxylate also helps provide a sorbent material having excellent anti-static properties. Desirably, the fatty acid ester ethoxylate include compounds having the following formula:

$$R_3—CO_2—(EtO)_m—R_4$$

where:

$R_3$=$C_4$–$C_{22}$ aliphatic and even more desirably about $C_8$–$C_{20}$ or $C_7$–$C_{22}$ alkyl phenyl and even more desirably $C_9$–$C_{16}$ alkyl phenyl;

$R_4$=$C_8$–$C_{20}$ aliphatic and even more desirably about $C_{12}$; and

EtO=ethylene oxide m=2–25 and even more desirably about 3–15.

Desirably the third component, i.e. component (c), comprises a poly(ethylene glycol)ester such as, for example, poly(ethylene glycol monolaurate); poly(ethylene glycol dioleate); poly(ethylene glycol monooleate); poly(glycerol monooleate) and so forth. An exemplary poly(ethylene glycol monolaurate) is commercially available from the Henkel Corporation under the trade name EMEREST 2650.

Accordingly, sorbent materials of the present invention exhibit excellent absorption for oil based liquids, water, and also highly basic and acidic liquids. The sorbent materials of the present invention can have a drop test time or rate of less than about 15 seconds, and even less than about 5 seconds, for each of the aforesaid liquids. In particular, the sorbent materials can have a drop test of less than 15 seconds for paraffin oil; water; 70% $H_2SO_4$ and 30% NaOH. Further, the sorbent materials can have a drop test of less than about 5 seconds for paraffin oil; water; 70% $H_2SO_4$ and 30% NaOH. Still further, the sorbent materials of the present invention can have a drop test time under 15 seconds for 98% $H_2SO_4$ and 40% NaOH. In addition, the sorbent material can have a specific capacity of at least about 8 grams oil per gram substrate and even about 11 grams oil per gram substrate or more. Still further, the sorbent materials of the present invention can exhibit excellent anti-static properties wherein the sorbent material has a Surface Resistivity of less than $1\times10^{12}$ ohms per square of fabric and even more desirably a surface resistivity of less than $1\times10^{11}$ ohms per square of fabric. The sorbent materials of the present invention can also exhibit an Electrostatic Decay (90%) of less than 0.5 seconds and even less than about 0.1 seconds. Further, sorbent materials of the present invention can provide the aforesaid characteristics while having low metallic ion extractables; in this regard the sorbent material desirably has metal ion extractables less than about 100 parts per million (ppm) and still more desirably has metal ion extractables less than about 70 parts per million (ppm).

In a further aspect of the present invention, sorbent materials, having excellent absorbency characteristics such as those identified immediately above, can comprise a substrate having a wetting chemistry applied thereto comprising a mixture of (a) about 10% to about 90% (by weight) of an alcohol ethoxylate selected from the group consisting of an alkyl alcohol ethoxylate, an aryl alcohol ethoxylate and/or fluorinated analogs thereof; and (b) about 1% to about 49% (by weight) of a surfactant selected from the group consisting of an alkyl sulfosuccinate, an alkyl sulfate and a sulfated fatty acid ester; (c) about 5% to about 85% (by weight) of a fatty acid ester ethoxylate; and (d) about 1% to about 49% (by weight) of a glycoside or glycoside derivative wherein the combination of components (b) and (d) do not collectively exceed about 50% by weight of the wetting chemistry. Desirably the wetting chemistry comprises a mixture of (a) about 50% to about 90% (by weight) of an alkyl or aryl alcohol ethoxylate; and (b) about 5% to about 20% (by weight) of a surfactant selected from the group consisting of an alkyl sulfosuccinate, an alkyl sulfate and a sulfated fatty acid ester alkyl sulfosuccinate; (c) about 10% to about 35% (by weight) of a fatty acid ester ethoxylate; and about 5% to about 20% (by weight) of a glycoside or glycoside derivative wherein the combination of components (b) and (d) do not collectively exceed about 40% by weight of the wetting chemistry.

Suitable glycosides include both monoglycosides and polyglycosides. Desirably, however, the glycoside comprises an alkyl polyglycoside and even more desirably an alkyl polyglycoside having from about 8 to about 10 carbons in the alkyl chain. Exemplary alkyl glycosides are disclosed in U.S. Pat. No. 5,385,750 to Aleksejczyk et al. and U.S. Pat. No. 5,770,549 to Gross, the entire contents of which are incorporated herein by reference. Alkyl polyglycosides are commercially available such as, for example, those sold under the trade names APG, GLUCOPON and PLANTAREN available from Henkel Corporation of Amber, Pa. An exemplary alkyl polyglycoside is octylpolyglycoside, such as that offered by Henkel Corporation under the trade name GLUCOPON 220UP, having a degree of polymerization of about 1.4 and the following chemical formula:

x = 0–3

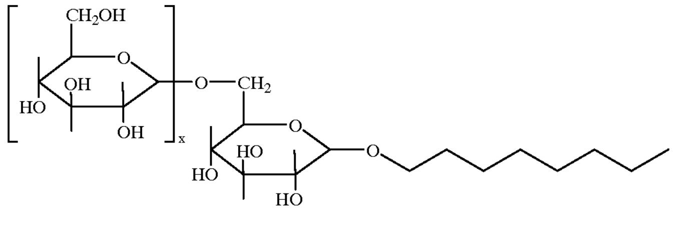

Additional materials, which are compatible with and do not substantially degrade the intended use or function of the wetting chemistry or substrate, can optionally be added to the wetting chemistry described herein. As an example, additional surfactants, builders, dyes, pigments, fragrance, anti-bacterial, odor control agents, etc. can be added to the wetting chemistry as desired to provide additional characteristics to the sorbent material.

The wetting chemistry described herein can be utilized in conjunction with a wide variety of cleaning and/or sorbent substrates. In reference to FIG. 1, a porous substrate can comprise a fibrous sheet having numerous interstitial spaces therein. Desirably the wetting chemistry is applied to a porous, durable substrate such as, for example, nonwoven webs, multilayer laminates, open cell foams, woven materials and so forth. In a preferred embodiment the wetting chemistry is used in conjunction with a fibrous sheet, such as a nonwoven web, having numerous interstitial spaces throughout the fabric. In a further aspect, the nonwoven web desirably comprises polyolefin fibers and even more desirably polypropylene fibers. Suitable nonwoven fabrics or webs can be formed by many processes such as for example, meltblowing processes, spunbonding processes, hydroentangling processes, air-laid processes, bonded carded web processes and so forth.

As a particular example, spunbond fiber webs are well suited for use in the present invention. Spunbond fiber webs having basis a weight from about 14 to about 170 grams/square meter (gsm) and even more desirably from about 17 to about 85 gsm are particularly well suited for use as a variety of sorbent materials ranging from wipes to floor mats. Methods of making suitable spunbond fiber webs include, but are not limited to, U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, U.S. Pat. No. 5,382,400 to Pike et al., and U.S. Pat. No. 5,759,926 to Pike et al. High-loft crimped, multicomponent spunbond fiber webs, such as those described in U.S. Pat. No. 5,382,400 to Pike et al., are particularly well suited to forming sorbent materials with good absorbency characteristics; the entire content of the aforesaid patent is incorporated herein by reference.

As a further example, additional substrates suitable for use with the present invention include meltblown fiber webs. Meltblown fibers are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Meltblown processes are disclosed, for example, in U.S. Pat. No. 3,849,241 to Butin et al., U.S. Pat. No. 5,721,883 to Timmons et al., U.S. Pat. No. 3,959,421 to Weber et al., U.S. Pat. No. 5,652,048 to Haynes et al., and U.S. Pat. No. 4,100,324 to Anderson et al., and U.S. Pat. No. 5,350,624 to Georger et al. The meltblown fiber webs having high bulk and strength, such as those described in U.S. Pat. No. 5,652,048 to Haynes et al., are particularly well suited for use with the present invention; the entire content of the aforesaid patent is incorporated herein by reference. Meltblown fiber webs having a basis weight between about 34 gsm and about 510 gsm and even more desirably between about 68 gsm and about 400 gsm. Meltblown fiber nonwoven webs are particularly well suited for use as sorbent wipers and oilsorb materials.

As still a further example, the wetting chemistry of the present invention can be used in conjunction with multilayer laminates as well as other sorbent articles or devices. As used herein "multilayer laminate" means a laminate of two or more layers of material such as, for example, spunbond/meltblown (SM) laminates; spunbond/meltblown/spunbond (SMS) laminates; spunbond/film (SF) laminates; meltblown/film laminates; etc. Examples of multilayer nonwoven laminates are disclosed in U.S. Pat. No. 4,041,203 to Brock et al. and U.S. Pat. No. 4,436,780 to Hotchkiss et al.; the entire contents of the aforesaid references are incorporated herein by reference. The wetting chemistry described herein can be applied to one or more layers of the laminate as desired. In addition, varied wetting chemistries and/or other compositions can be applied to the respective layers of the laminate. As a particular example, the sorbent material can comprise an SMS laminate wherein the outer spunbond layers are treated with an alcohol ethoxylate and the inner meltblown layer(s) treated with the wetting chemistry described herein above. In one aspect, the inner meltblown fiber layer(s) can be treated with a wetting chemistry comprising (a) about 50% to about 90% (by weight) of an aliphatic alcohol ethoxylate and (b) 10% to about 50% (by weight) of a surfactant selected from the group consisting of an alkyl sulfosuccinate, an alkyl sulfate and a sulfated fatty acid ester.

By way of example, additional materials, laminates and/or articles suitable for use with the present invention are described in U.S. Pat. No. 5,281,463 to Cotton; U.S. Pat. No. 4,904,521 to Johnson et al.; U.S. Pat. No. 4,328,279 to Meitner et al.; U.S. Pat. No. 5,223,319 to Cotton et al.; U.S. Pat. No. 5,639,541 to Adam; U.S. Pat. No. 5,302,249 to Malhotra et al.; U.S. Pat. No. 4,659,609 to Lamers et al.; U.S. Pat. No. 5,249,854 to Currie et al.; U.S. Pat. No. 5,620,779 to McCormack; and U.S. Pat. No. 4,609,580 to Rockett et al. Although the present invention is discussed primarily in connection for use with industrial wipes, mats and the like, one skilled in the art will appreciate that its usefulness is not limited to such applications.

The wetting chemistry can be applied to the substrate by any one of numerous methods known to those skilled in the art. Preferred methods of applying the wetting chemistry substantially uniformly apply the wetting chemistry throughout the porous substrate. One method for treating substrates is described herein below in reference to FIG. 2. Porous substrate 22, such as a nonwoven web, is unwound from supply roll 20 and travels in the direction of the arrows associated therewith. However, it will be appreciated that the porous substrate could be made in-line as opposed to being unwound from a supply roll. Porous substrate 22 is then passed under an applicator 24, such as a spray boom, wherein an aqueous liquid 26, containing the wetting chemistry, is applied or sprayed onto porous substrate 22. Vacuum 28 can, optionally, be positioned under porous substrate 22 in order to help draw aqueous liquid 26 through the web and improve the uniformity of treatment. Thereafter the porous substrate, with aqueous liquid 26 thereon, is optionally passed through dryer 27 as needed to drive off any remaining water. Upon driving off the water, the solids or wetting chemistry remains upon or in substrate 22 thereby providing sorbent material 23 which has excellent absorbency characteristics. Desirably, the wetting chemistry comprises from about 0.1% to about 20% of the total weight of the dried sorbent material and even more desirably comprises about 0.2% to about 10% of the total weight of the dried sorbent material. Still more desirably, the wetting chemistry comprises and add-on weight of about 0.3% to about 5% of the weight of the porous substrate. The dried sorbent material 23 can then be wound on winding roll 29 (as shown) for subsequent use and/or conversion. Alternatively, dried sorbent material 23 can be converted immediately thereafter as desired.

Figure 2:
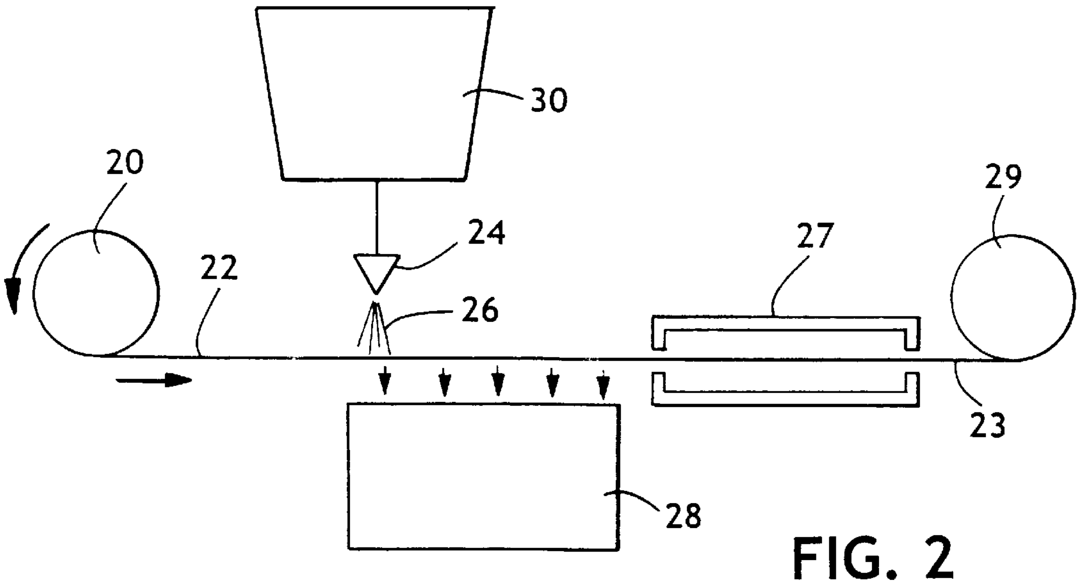
FIG. 2 is a schematic drawing of a process line for making sorbent materials of the present invention.

Still in reference to FIG. 2, aqueous liquid 26 can be provided from a tank or container 30. Aqueous emulsion or solution 26 desirably comprises from about 95% to about 99.5% (by weight) water and from about 0.5% to about 5% solids and more desirably about 97% water and about 3% solids. As used herein "solids" collectively refers to the sum combination of each of the components of the wetting chemistry described herein above. Use of higher weight % solids offers improved efficiency in terms of the ability to use lower throughputs and thus reduced waste and improved drying. However, as the percent of solids increases so does the viscosity of the aqueous emulsion, which may make homogenous treatment of the porous substrate more difficult to achieve. Additionally, in order to avoid the use of preservatives and other like agents within the aqueous solution, just prior to treating the substrate, the aqueous solution can be heated to a temperature from about 40° C. to about 80° C., and more desirably to about 50° C., in order to prevent growth of bacteria or other undesirable organisms which may be present in the aqueous solution. However, in this regard it should be noted that if insufficient levels of co-surfactants are used, such as poly(ethylene glycol) ester and/or alkyl polyglycoside, the alcohol ethoxylate tends to phase separate upon heating to such temperatures.

Figure 3:
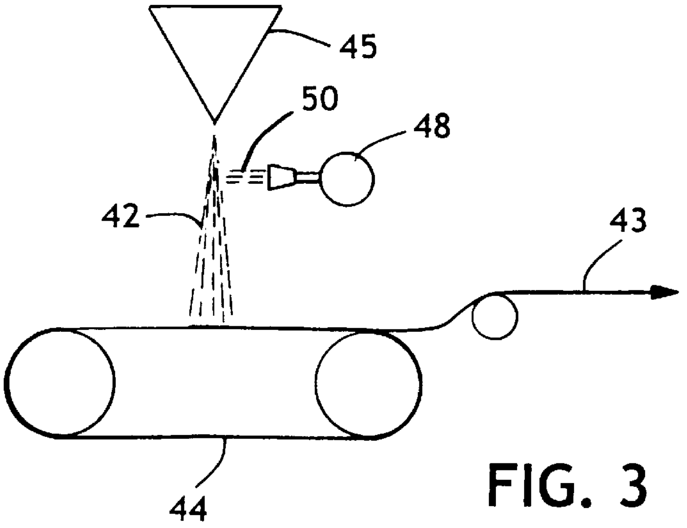
FIG. 3 is a schematic drawing of a process line for making sorbent materials of the present invention.

In a further aspect, it is also possible to treat many of the porous substrates in-line. This may provide improved uniformity in treatment as well as aiding in drying of the substrate web. As an example, and in reference to FIG. 3, a meltblown fiber web 43 is made by depositing meltblown fibers 42 onto a forming wire 44. In this regard, meltblown fibers 42 are blown from a series or bank of meltblown dies 45 onto a moving foraminous wire or belt 44. Spray booms 48 are desirably located adjacent each bank or series of meltblown dies 45 in order to spray blown fibers 42 with aqueous solution or emulsion 50 prior to formation of meltblown web 43 on the forming wire 44. The heat of the blown fibers causes most of the water to flash off and thus a separate, additional drying step is typically not required. Additional methods of treating substrates are also suitable for use with the present invention such as, for example, "dip and squeeze" processes, brush coating processes and so forth.

TESTS

Absorption Capacity: a 4 inch by 4 inch specimen is initially weighed. The weighed specimen is then soaked in a pan of test fluid (e.g. paraffin oil or water) for three minutes. The test fluid should be at least 2 inches (5.08 cm) deep in the pan. The specimen is removed from the test fluid and allowed to drain while hanging in a "diamond" shaped position (i.e. with one corner at the lowest point). The specimen is allowed to drain for three minutes for water and for five minutes for oil. After the allotted drain time the specimen is placed in a weighing dish and then weighed. Absorbency of acids or bases, having a viscosity more similar to water, are tested in accord with the procedure for testing absorption capacity for water. Absorption Capacity (g)=wet weight (g)−dry weight (g); and Specific Capacity (g/g)=Absorption Capacity (g)/dry weight (g). This test is more thoroughly described herein below.

Drop Test (for absorbency rate): A specimen is placed over the top of a stainless-steel beaker and covered with a template to hold the specimen in place. Using a pipette at a right angle 0.1-cc liquid is dispensed, onto the specimen. The liquid is dispensed at a height of no more than 2.54 cm above the fabric. The timer is started simultaneously with the dispensing of the liquid onto the specimen. When the fluid is completely absorbed, the timer is stopped. The end point is reached when the fluid is absorbed to the point where light is not reflected from the surface of the liquid. The average of at least three tests is used to calculate the time.

Electrostatic Decay: This test determines the electrostatic properties of a material by measuring the time required dissipating a charge from the surface of the material. Except as specifically noted, this test is performed in accord with INDA Standard Test Methods: IST 40.2 (95). Generally described, a 3.5 inch by 6.5 inch specimen is conditioned, including removal of any existing charge. The specimen is then placed in electrostatic decay testing equipment and charged to 5,000 volts. Once the specimen has accepted the charge, the charging voltage is removed and the electrodes grounded. The time it takes for the sample to lose a pre-set amount of the charge (e.g. 50% or 90%) is recorded. The electrostatic decay times for the samples referenced herein were tested using calibrated static decay meter Model No. SDM 406C and 406D available from Electro-Tech Systems, Inc. of Glenside, Pa.

Electrical Resistivity (Surface Resistivity): This test measures the "resistivity" or opposition offered by a fabric to the passage through it of a steady electric current and quantifies the ease with which electric charges may be dissipated from a fabric. Surface Resistivity or Electrical Resistivity values reflect a fabric's ability to dissipate a charge and/or the tendency of a fabric to accumulate an electrostatic charge. Except as noted below, the test is performed in accord with INDA Standard Test Method: IST 40.1 (95). Generally described, a one by four inch specimen is placed between two electrodes spaced one inch apart such that the specimen and electrodes define a one inch square. A 100 volt direct current is then applied and the amount of current actually transmitted by the specimen is read on an electrometer. The data described herein was obtained in accord with the INDA Standard Test at 50% RH using an electrometer such as Model 610C available from Keithley Instruments, Inc. of Cleveland, Ohio.

EXAMPLES

Example 1

A 2 ounce per square yard (about 68 $g/m^2$) polypropylene meltblown fiber web was formed having a wetting chemistry add-on weight of about 0.4% (by weight). The wetting chemistry comprised a 2:1:0.75 (by weight) mixture of RENEX KB: EMEREST 2650: AEROSOL OT-75. The sorbent material had the following properties:

Surface Resistivity (MD Face)=$1.01\times10^{11}$ ohms per square of fabric

Surface Resistivity (CD Face)=$9.76\times10^{10}$ ohms per square of fabric

Surface Resistivity (MD Anvil)=$4.09\times10^{10}$ ohms per square of fabric

Surface Resistivity (CD Anvil)=$4.72\times10^{10}$ ohms per square of fabric

Electrostatic Decay (CD Anvil, 90%, +charge)=0.060 seconds

Electrostatic Decay (CD Anvil, 90%, −charge)=0.038 seconds

Electrostatic Decay (CD Face, 90%, +charge)=0.066 seconds

Electrostatic Decay (CD Face, 90%, −charge)=0.046 seconds

Specific Capacity (Paraffin Oil)=8.107 g/g

Specific Capacity (Water)=7.693 g/g

Example 2

A 2.5 ounce per square yard (85 g/$m^2$) polypropylene meltblown fiber web was formed having a wetting chemistry add-on weight of about 0.3% (by weight). The wetting chemistry comprised a 60:40 (weight ratio) mixture of RENEX KB: AEROSOL OT-75. The sorbent material has an absorption capacity of about 470% for oil, about 400% for water and metal ion extractables of about 68 ppm for sodium and about 24 ppm for chlorine.

Example 3

A 0.375 ounces/square yard (about 13 g/$m^2$) nonwoven web of polypropylene spunbond fibers was made and treated with RENEX KB wherein the aliphatic alcohol ethoxylate has an add-on weight of 0.4%. The treated spunbond fabric is then wound on a winder roll. A 1.6 ounces/square yard (about 54 g/$m^2$) nonwoven web of polypropylene meltblown fibers was formed having a wetting chemistry add-on weight of about 0.3%. The spunbond fabric was unwound from two winder rolls and superposed with the meltblown fabric such that the meltblown fabric is positioned between the two spunbond fabric layers. The multiple layers were then thermal point bonded to form an integrated SMS laminate. The SMS laminate had an average electrostatic decay (90%, CD face) of about 0.21 seconds for a positive charge and an electrostatic decay (90%, CD face) of about 0.25 seconds for a negative charge.

While various patents and other reference materials have been incorporated herein by reference, to the extent there is any inconsistency between incorporated material and that of the written specification, the written specification shall control. In addition, while the invention has been described in detail with respect to specific embodiments thereof, and particularly by the examples described herein, it will be apparent to those skilled in the art that various alterations, modifications and other changes may be made without departing from the spirit and scope of the present invention. It is therefore intended that all such modifications, alterations and other changes be encompassed by the claims.

What is claimed is:

1. A sorbent material comprising:

a porous substrate having a wetting chemistry upon the surface thereof; said wetting chemistry comprising (a) an alcohol ethoxylate selected from the group consisting of an alkyl alcohol ethoxylate, an aryl alcohol ethoxylate and halogenated analogs thereof; (b) a surfactant selected from the group consisting of an alkyl sulfosuccinate, an alkyl sulfate and a sulfated fatty acid ester; and (c) a fatty acid ester ethoxylate.

2. The sorbent material of claim 1 wherein said component (a) comprises an alkyl ethoxylate.

3. The sorbent material of claim 2 wherein said wetting chemistry component (a) comprises an alkyl alcohol ethoxylate having from 2 to 25 carbons in the alkyl chain.

4. The sorbent material of claim 3 wherein said wetting chemistry component (a) comprises an alkyl alcohol ethoxylate having from about 4 to about 12 ethylene oxide units.

5. The sorbent material of claim 2 wherein said component (a) comprises an aliphatic alcohol ethoxylate.

6. The sorbent material of claim 5 wherein said component (c) fatty acid ester ethoxylate a poly(ethylene glycol) ester.

7. The sorbent material of claim 5 wherein said component (b) comprises an alkyl sulfosuccinate.

8. The sorbent material of claim 5 wherein said components a:b:c are in a weight ratio of about 1:1:1 to about 4:1:1, respectively.

9. The sorbent material of claim 5 wherein said porous substrate comprises a nonwoven web and further wherein the wetting chemistry comprises from about 0.1 to about 20% of the sorbent material.

10. The sorbent material of claim 2 wherein said porous substrate has an electrostatic decay of less than 0.5 seconds and comprises a nonwoven web of polyolefin fibers and further wherein the wetting chemistry comprises from about 0.1 to about 20% of the sorbent material.

11. The sorbent material of claim 1 wherein the porous substrate comprises a fibrous material and has a surface resistivity of less than $1\times10^{12}$ ohms per square of fabric and an absorption rate of less than 5 seconds for paraffin oil, water, 50% sulfuric acid and 30% sodium hydroxide.

12. The sorbent material of claim 10 wherein said porous substrate comprises a meltblown fiber web having a basis weight between about 14 g/$m^2$ and about 120 g/$m^2$ and further wherein said sorbent material has absorption rate of less than 15 seconds for paraffin oil, water, 98% sulfuric acid and about 40% sodium hydroxide.

13. The sorbent material of claim 1 wherein said wetting chemistry further comprises a glycoside.

* * * * *